United States Patent
Rauschmayer

(10) Patent No.: US 6,898,418 B2
(45) Date of Patent: May 24, 2005

(54) METHOD OF AND APPARATUS FOR IMPLEMENTING ADAPTIVE DOWNSTREAM MODULATION IN A FIXED WIRELESS COMMUNICATION SYSTEM

(75) Inventor: Dennis Rauschmayer, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 550 days.

(21) Appl. No.: 10/003,861

(22) Filed: Nov. 2, 2001

(65) Prior Publication Data

US 2003/0087651 A1 May 8, 2003

(51) Int. Cl.⁷ ................................................ H04B 1/00
(52) U.S. Cl. ........................ 455/69; 455/68; 455/67.11; 455/552.1; 455/553.1; 370/389; 370/351; 370/465; 370/464
(58) Field of Search ......................... 455/69, 68, 67.11, 455/552.1, 553.1, 552, 553; 370/389, 351, 465, 464, 347, 468

(56) References Cited

U.S. PATENT DOCUMENTS

| | | | | |
|---|---|---|---|---|
| 6,542,517 B1 | * | 4/2003 | Giacalone | 370/465 |
| 6,542,718 B1 | * | 4/2003 | Kuo et al. | 455/69 |
| 6,549,759 B2 | * | 4/2003 | Arviv et al. | 455/69 |
| 6,564,067 B1 | * | 5/2003 | Agin | 455/522 |
| 6,690,655 B1 | * | 2/2004 | Miner et al. | 370/278 |
| 6,700,879 B1 | * | 3/2004 | Taylor | 370/332 |
| 6,836,484 B2 | * | 12/2004 | Suzuki | 370/465 |
| 2003/0002495 A1 | * | 1/2003 | Shahar at al. | 370/389 |

* cited by examiner

Primary Examiner—Sonny Trinh
Assistant Examiner—Khai Nguyen
(74) Attorney, Agent, or Firm—Abdul Zindani; W. James Brady, III; Frederick J. Telecky, Jr.

(57) ABSTRACT

Available quadrature amplitude modulation ("QAM") carriers transmittable by a base station to customer sites are substantially equally divided among the sites according to the expected quality of reception. ARQ transmissions from the sites are monitored as a measure of the quality of signals received by the sites. If the quality of received signals is unacceptable, the affected site is re-assigned to a higher quality QAM. In addition, if the quality of received signals is too high, the affected site is re-assigned to a lower quality QAM.

26 Claims, 2 Drawing Sheets

METHOD OF AND APPARATUS FOR IMPLEMENTING ADAPTIVE DOWNSTREAM MODULATION IN A FIXED WIRELESS COMMUNICATION SYSTEM

FIELD OF THE INVENTION

The present invention relates to the implementation of Adaptive Downstream Modulation ("ADM") in a fixed wireless communication system, and, more specifically to apparatus and a methodology of implementing ADM in fixed wireless base stations utilizing Data Over Cable Service Interface Specifications ("DOCSIS") as a Media Access Control ("MAC") protocol.

BACKGROUND OF THE INVENTION

Originally intended in the United States to be used primarily for instructional television broadcasts, the 2.5 to 2.7 GHz spectrum was found to be under-utilized for that purpose. Ultimately the FCC granted permission for this spectrum to be utilized by fixed wireless communication systems, including fixed Broadband Wireless Access ("BWA"), and, more specifically, Broadband Wireless Internet Access ("BWIA") applications and systems.

Fixed wireless systems are typically used to expeditiously transmit large quanta of data on high volume networks, including those used to access the Internet or World Wide Web ("WWW"). A typical high-speed-high-volume data transfer network includes one or more remote originating stations, where data are created or stored. The created or stored data are transmitted to a base station which includes a transceiver. The base station may wirelessly communicate with the Customer Premises Equipment ("CPE") of one or more subscribers or customers ("users" herein) who randomly and periodically desire to access the data via CPE ("Customer Premises Equipment"), such as a computer (PC, laptop, etc.), a computer system, a personal data assistant or a similar device. To this end, each item of CPE includes a wireless modem which includes a transceiver that can send data to and receive data from the transceiver in the base station. The data transfer network also includes a so-called "backbone" network on which various control signals are transmitted via the transceivers in the base station and the modems of the users.

If sufficient users are present in a given venue, multiple base stations (or "head ends") may be set up in, and service, one or more respective adjacent or overlapping cells located in the venue. The data are transmitted from the data generators and/or data storage facilities in one or more originating stations to the base stations, typically via Hybrid Fiber/Coax ("HFC") networks, but also via optical fibers, satellites, or other suitable links therebetween. The data are then transmitted by the base stations to the users within the venue. It has been found less expensive and more expedient to furnish these data from the base stations to the users via wireless techniques rather than by landlines or other non-wireless expedients.

In the foregoing regard, as with a cellular telephone network, it is necessary that two-way communications take place between each base station and each user's CPE served thereby. That is, each base station must be able to send data and information to the CPEs served thereby—so-called down link (down load or down stream) data—and each CPE must be able to send data and information to the base station serving it—so-called up link (up load or up stream) data. When the FCC gave permission to use the 2.5–2.7 GHz spectrum for fixed wireless communications, it also gave approval to the use of two-way communications thereover. As noted above, the data and information includes data desired to be accessed by the users and control signals and training messages for establishing and regulating the flow of data to the users.

It is well known that the quality of wireless communications can be adversely affected by such things as (i) meteorological events, solar flares and other nearby electrical systems, and (ii) objects and structures located between, or near the path between, a transmitter and its served receivers. Other structures and occurrences may have an effect on or influence the modulated electromagnetic waves attending this form of communication. Wireless communications may be deleteriously affected by interference, which may be caused by the items in (i), above, and fading, which may be caused by the items in (ii), above.

Fading is caused by fluctuations in the amplitude of a transmitted wireless electromagnetic signal. The fluctuations are the result of multipath transmission of the transmitted signal resulting from one or more reflections of the signal from objects between its transmitter and a receiver or near the path between the transmitter and the receiver. Each reflection creates an additional transmission path for the signal, and each path has associated therewith some time delay. The overall effect at the receiver of the transmitted signal and the reflected signal(s) is that of a vectorial combination of variously delayed signals, with each received signal contributing a different phase and magnitude. There results a standing wave pattern between the transmitter and the receiver, where fading is caused by changes in magnitude versus spatial location.

Fading—whether flat fading or frequency selective fading—may be minimized, if not eliminated, by various signal processing techniques, referred to as channel equalization, including a technique called Decision Feedback Equalization ("DFE"). Depending on the various factors, successful channel equalization can represent major labor effort and monetary expenditure. If fading occurs because of reflections from stationary objects, such as buildings, the standing wave pattern is static in space. If the signals are reflected from a moving object, such as automobile traffic, channel equalization is even more difficult and expensive to achieve, since the standing wave pattern now moves in space. Also, the cost and complexity of channel equalization increases significantly with transmission rate.

Other steps to minimize or eliminate fading include providing a line-of-sight path between a transmitter and a receiver, the use of highly directional antennas and the use of multiple antennas at the receiver and/or the transmitter.

Transmissions in nearby cells or systems using the same carrier frequency may cause co-channel interference. Other services or equipment, as well as meteorological phenomena, utilizing or producing signals at the carrier frequency may also result in interference. Attempts to reduce or eliminate interference often include increasing the distance between the transmitter and the interfering equipment. This expedient may not be available, especially where large permanent structures or meteorological sources are involved, and if available, may prove very costly. Where the interfering equipment is a wireless communication system, interference reduction may be achieved through a decrease in frequency reuse by the interfering equipment. But, reducing frequency reuse in the interfering system concomitantly reduces that system's capacity.

Interference may be mitigated by spreading the signal over the frequency spectrum through the use of spread spectrum techniques. Interference may also be mitigated by using Orthogonal Frequency Division Multiplexing ("OFDM") and coding across the frequency spectrum. This latter technique has been found to be as beneficial as spread spectrum techniques.

Moreover, OFDM has been found to ameliorate fading caused by multipath transmission. Alternatives to OFDM—Single Carrier Modulation ("SCM")+equalization, direct sequence spreading and adaptive space-time coding—have been shown to be less advantageous. In any event, OFDM is the technique of choice at the high transmission rates used in broadband wireless systems. More particularly, the use of OFDM and multiple transmit/receive antennas in a broadband wireless system has led to the realization of an efficient, low error rate system for transmitting large quanta of data at high speed. For further discussion of the foregoing, reference is made to Document Number WP-1_TG-1, Version 1.2 (Dec. 15, 2000), a white paper of the Broadband Wireless Internet Forum ("BWIF"), entitled *VOFDM Broadband Wireless Transmission and Its Advantages over Single Carrier Modulation*.

A communication system is typically subject to a Media Access Control ("MAC") protocol, i.e., a protocol that allocates the use of communication channels among independent, competing users. BWIF has selected DOCSIS ("Data Over Cable Service Interface Specification") as the MAC for use by Fixed BWI systems, even though DOCSIS was developed for cable systems.

In the early days of networking, the choice of using circuit switching or packet switching was said to depend on performance and cost considerations. Although "correct" choices were said to be difficult to make, a general rule of thumb was set forth: Circuit switching is suitable for networking with constant bit rate voice or video, while packet switching is preferred for bursty data sources such as computer data sources. Today, packet switching is better developed and its performance/cost tradeoffs are well understood. Accordingly, packet switching is presently usually preferred as the multiplexing technique to be associated with all sources, including voice, video and data under both Internet Protocol ("IP") and Asynchronous Transfer Mode ("ATM") scenarios. For many, if not most, applications, packet switching has a throughput advantage over circuit switching of one hundred or more. When user-acceptable computer response times are considered, packet switching offers a WWW throughput advantage over circuit switching of more than fifteen. If a system has N users, circuit switching can deliver, at best, 1/N of the total channel capacity to each user. Packet switching offers a user access to the full bandwidth nearly instantaneously.

Thus, the types of wireless systems under consideration best utilize OFDM/DOCSIS/packet switching. See Document Number WP-2_TG-1, Version 1.1 (Dec. 5, 2000), a BWIF white paper entitled *Media Access Protocols: Circuit Switching to DOCSIS*. This type of system can be generally characterized as a Multichannel Multipoint Distribution Service ("MMDS") in which (1) the base station continuously transmits data to, and makes these data available to, all of the CPEs served thereby, but (2) in order to access data transmitted from the base station, the base station must first accept a service request previously transmitted thereto by a CPE.

DOCSIS is a Demand Assignment ("DA") MAC, which, it has been determined, is the species of MAC that exhibits the best performance for data and voice sources. Use of a DA MAC connotes that a CPE must first make a service request (a demand) for service from the base station. DOCSIS is based on the premise that transmitted data packets are pre-defined IP packets, although provisions exist for the transmission of ATM cells. DOCSIS supports variable length Protocol Data Unit ("PDU") comprising an Ethernet-type Packet. The structure of the pre-defined packet cannot be broken, or the intended receiver, here, either the CPE or the base station, cannot access and read the data in the packet.

Notwithstanding the use of OFDM, multiple antennas and DOCSIS, experience has shown that the wireless path between a base station and a CPE is more subject to degradation or transmission difficulties than is the HFC or other network between the base station and the originating station(s). Such degradation is usually manifested by the failure of one or more data packets transmitted by the base station to reach, or be properly received by, a user, or from the failure of a user request or demand to reach, or be properly received by, the base station. In the former event, the packet(s) is(are) accordingly "lost" to the receiving entity, the CPE.

Accordingly, there has arisen a need for a technique pursuant to which the CPE may automatically request a retransmission of the "missing", corrupted or otherwise degraded packet(s) from the transmitting entity for receipt by the receiving entity. Addressing this need is one goal of the present invention. As presently constituted, MMDS utilizing DOCSIS contains no standard provision for an Automatic Repeat Request ("ARQ") to be made by CPE in response to the loss or degradation of one or more data packets in a message sent by a serving base station. The provision of an ARQ function in an MMDS, broadband wireless communication system is described in my commonly assigned United States Patent application, Ser. No. 10/035,667, entitled "METHOD OF AND APPARATUS FOR IMPLEMENTING AN AUTOMATIC REPEAT REQUEST FUNCTION IN A FIXED WIRELESS COMMUNICATION SYSTEM."

It should be noted herein that the term "ARQ" is used to denote any technique or method, and any hardware/software for performing the technique or method, by which a downstream, normally receiving entity, such as CPE at a customer site, (1) alerts or informs an upstream, normally transmitting entity, such as a base station, that a transmission to the former by the latter has been lost or degraded and (2) requests that the lost or degraded portion of the transmission be re-sent. Stated differently, "ARQ' refers to a method by which a downstream receiving entity informs an upstream transmitting entity that a transmission was defective and should be sent again.

Notwithstanding the presence of an ARQ function in the system, numerous retransmissions of missing data to CPE devices decreases the speed and efficiency of the system. Specifically, since the base station typically transmits the same data to all CPE devices, retransmission to any one CPE device represents a time when new data are not being transmitted to any of the devices. Accordingly there is a need for a technique that permits upgrading the path over which a CPE device receives data when that device experiences data degradation.

SUMMARY OF THE INVENTION

It is known that a transmission path may be upgraded by lengthening the transmission time. Concomitantly, it is also known to use a modulation scheme what has a smaller number of levels. Accordingly, in its broadest aspect, the present invention is a method of performing downstream adaptive modulation in an MMDS, broadband, fixed wireless communication system. The system includes a base station having a transceiver. The system also includes one or more CPE devices each of which also has a transceiver. The system preferably utilizes a DOCSIS MAC pursuant to which the PDU is a variable length, Ethernet-type data packet.

The base station transmitter is primarily, but not solely, used to transmit to the CPE data requested by the user thereof. The CPE is used primarily, but not solely, to send messages comprising data which constitute requests to the base station for the base station to send or re-send to the CPE receiver the user-requested data. Typically the user-requested data received at the CPE originates at a location remote from the base station and sent thereto via cable, optical fiber, satellite, other data generators/storage facilities or some combination thereof.

In practicing the method, the base station is operated to transmit data downstream to the CPE devices in a plurality of data modulation modes. For example, each data modulation mode may be a QAM mode that includes a group of tones and has a selected transmission time, the lower groups having slower transmission times, lower constellation density and being less susceptible to degradation. The modulation modes may be QAM tones, of 4, 16, 64, 256 etc.

A selected modulation mode is assigned to the respective CPE devices. For example, the devices nearer to the base station may have assigned thereto 64 QAM, because reception thereby is less subject to degradation by extraneous factors. The devices farthest from the base station may have assigned to them 4 QAM, a slower but higher quality carrier, based on the assumption that these devices' reception will be degraded more often. A CPE device that has had assigned to it 64 QAM cannot demodulate any signals on the 4 QAM, 16 QAM or other carriers. The assignment of carrier frequencies is achieved by the base station sending appropriate control or training messages to the CPE devices.

Facilities in the base station monitor the quality of downstream data transmission to, and the reception thereof by, each CPE device. A variety of monitoring techniques may be used. Preferably, the transmission of upstream ARQ messages by the CPE devices to the base station is used as a measure of the quality of downstream data transmission. The more ARQ messages per unit time that are sent by a given CPE device, the lower is the quality of that CPE device's transmission path from the base station.

ARQ messages—or any other measure of the transmission paths to the CPE devices—that are sent to the base station by a CPE device may be analyzed according to a range of algorithms. For example, the base station maybe operated or programmed to define a range or band of acceptable path quality indicated by a range of ARQ messages per unit time from each CPE device. This range or band may be a 0, 1 or any other number as determined by the system operator. A higher-than-acceptable, or superior, path quality is indicated by a number of ARQ messages per unit time that is lower than the acceptable range. A lower-than-acceptable, or unacceptable, path quality is indicated by a number of ARQ messages per unit time that is higher than the acceptable range. If the acceptable range of ARQ messages is selected as Zero (0), there are only two ranges of path quality, acceptable and unacceptable.

The ARQ messages may be used to affect the CPE devices that send them in a number of ways. First, if the number of ARQ messages per unit time received from a CPE device indicates that the transmission path from the base station to that device is unacceptable, the base station sends a control or training message to such CPE device enabling it to demodulate signals on a higher quality, slower path. For example, if the originally assigned path was 256 QAM, the base station may now assign 64 QAM in response to a determination that the device's reception at 256 QAM is unacceptable. Second, and similarly, if the number of ARQ messages per unit time indicates that the transmission path is superior, the base station may send a control signal enabling the affected CPE device to demodulate signals on a lower quality, faster path. For example, an originally assigned 4 QAM path may be replaced by a 16 QAM path.

The immediately foregoing paragraph assumes that a non-zero range of acceptable ARQ's per unit time is defined, and that there are three possible transmission path qualities: superior, acceptable and unacceptable. Accordingly, and third, if the number of ARQ messages per unit time indicates that the transmission path is acceptable—that is, is neither unacceptable nor superior—the base station does not affect the transmission path. Fourth, where the acceptable range is zero (0)—that is, there are only two types of transmission paths, acceptable and unacceptable, and the quality range is simply a break point between the two—unacceptable paths are upgraded to acceptable paths, and acceptable paths are unaffected.

BRIEF DESCRIPTION OF THE DRAWING

The present invention is described below in conjunction with the following drawing in which.

DETAILED DESCRIPTION OF THE INVENTION

Figure 1:
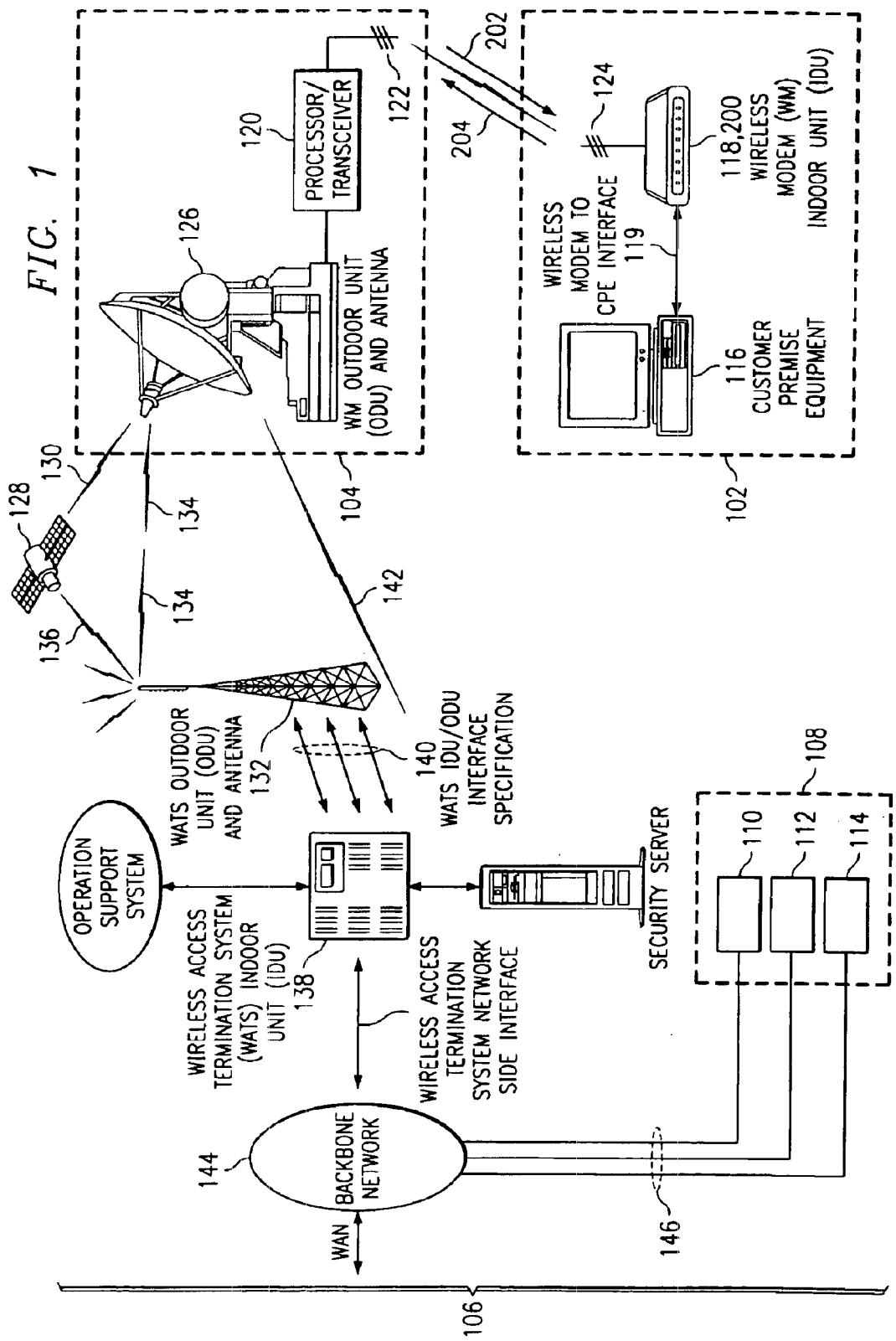
FIG. 1 is a generalized view of a wireless communication system, illustrating certain basic concepts relevant to the apparatus and method of the present invention.

Referring first to FIG. 1, there is shown a generalized, overview of a wireless communication system 100 in which the method and apparatus of the present invention ideally find use.

The system 100 includes a user or customer site 102, also referred to as the down stream or down load location, a base station 104, also referred to as the up stream or up load location, or the head end, and plural originating sites, collectively referred to by the reference numeral 106. The originating sites may comprise any of a variety of data and information sources 108, including computers 110, servers 112 and data/information storage units 114 of any convenient configuration. Typically, the data/information sources 108 may comprise some or all of the World Wide Web ("WWW"), multiple computers, servers and storage units 110,112,114 of which are scattered about the world. The function of the system 100 is to permit a user at the user site 102 to access data and information created by or stored in the data and information sources 108 on request.

The customer site 102 includes one or more CPE devices 116, such as a PC, a laptop computer, a palm computer, a personal data assistant, a server, a data storage unit, or the like. A user may request access to data or information from the data and information sources 108 and thereafter accesses the data or information via one or more of the CPE devices 116. Requests for data or information and the access thereto are effected via a wireless modem 118 located at the site 102 and appropriately coupled or connected to the CPE device 116, as depicted at 119. The modem 118 establishes two-way communication with a transceiver 120 in the base station 104 via one or more transmit/receive antennas 122 serving the transceiver 120 at the base station 104 and one or more transmit/receive antennas 124 serving the modem 118.

The system may be generally configured in much the same way as a cellular telephone system is configured. That is, the base station 104 may service and communicate with a number of user sites 102 within a given cell, while in each of additional cell there is a similar base station servicing user sites therein. Each cell may be adjacent to or slightly overlap one or more other cells.

The transceiver 120 may receive data and information to be accessed by its users in a number of ways. For example, an antenna or receiving dish 126 in the base station 104 that is connected to the transceiver 120 may receive signals from and send signals to one or more satellites 128, as shown by the path 130, or one or more remote antennas 132, as shown by the path 134. The satellite 128 may communicate with the antenna 132 via a path 136, eliminating, or acting as an alternative to, the path 134. The antenna 132 may receive data and information from further upstream systems 138 by cable, fiber optics or HFC wirelessly or via any other convenient transmission media, as designated by the reference numeral 140. The base station 104 may also be in direct communication with the upstream systems 138, in any convenient fashion, as shown by the path 142. The upstream systems 138 may communicate with the data and information sources 110,112,114 via a backbone network 144 by wire, fiber optics, HFC or wirelessly, as shown by the paths 146. The backbone network 144 may be viewed as including some or all of those portions of the system 100 other than the user site 102, the base station 104 and the elements located thereat.

Requests for data/information transmitted from the user site 102 to the base station 104 are communicated to the data and information sources 110,112,114 via the backbone network. The requested data/information is thereafter communicated to the base station 104 from the sources 110,112,114 along the backbone network 144 and from the base station 104 to the requesting user sites 102.

The present invention relates to communications between the base station 104 and the CPE devices 116 respectively served thereby. As noted above, the 2.5 to 2.7 GHz band was originally intended in the US to be used primarily for instructional television broadcasts. This band was found to be under-utilized for that purpose, so the FCC granted permission for this spectrum to be utilized by fixed wireless communication systems, including fixed BWA and BWIA applications and systems, of the type which preferably includes the base station 104 and various CPE devices 116 served by the base station 104.

The base station 104 establishes two-way wireless communication with the modems 118 and their associated CPE devices 116 of one or more users who may randomly and periodically desire to access data from the backbone network 144. In preferred embodiments the base station 104 and modems/devices 118/116 are transceiving points of a wireless Multichannel Multipoint Distribution Service ("MMDS") of the point-to-multipoint type utilizing DOCSIS (a demand assignment protocol) as its MAC which sends data and information in Ethernet packets of variable length. As a point-to-multipoint system, the head end or base station 104 continuously transmits modulated signals downstream toward all of the modem/CPE devices 118/116 served by the base station 104. Upstream transmission from the modem/CPE 118/116 toward the base station 104 occurs when the CPE 118/116 is operated to request a time slot during which it can receive, conflict-free, from the base station 104, data and information over the entire available bandwidth. In effect, in this type of system, the modem/CPE 118/116 must reserve bandwidth before data and information obtained from the backbone network 144 by the base station 104 may be transmitted to the user. Although it is preferred that the Ethernet packets transmitted by the base station 104 and the CPE 118/116 are IP packets, this type of system may also support ATM ("Asynchronous Transfer Mode") cell transmission.

Thus, it is necessary that two-way communications take place between each base station 104 and each user's CPE 118/116 served thereby. That is, each base station 104 must be able to send data and information to the CPE devices 118/116 served thereby—so-called down-link (down-load or down-stream) data—and each CPE device 118/116 must be able to send data and information to the base station 104 serving it—so-called up-link (up-load or up-stream) data.

As noted above, while the foregoing type of system 100 offers many advantages, the communication paths between the base station 104 and the modem/CPE devices 118/116 served thereby are more likely to experience incorrect or incomplete data transfers than is the backbone network 144. According to above-noted, co-pending patent application Ser. No. 10/035,667 by the present inventor, there is provided in the type of fixed wireless system 100 described herein a function which permits a user to obtain missing information or data, that is, information or data transmitted by the base station 104 which does not properly reach the modem 118 of the customer site 102. The invention of the co-pending application adds an ARQ function to the system 100 by inserting an ARQ "shim" between the OFDM physical layer and DOCSIS. As noted earlier, ARQ is used herein in a broader sense than merely the invention of the co-pending application.

As set forth in the co-pending application, when a packet of data is not properly received at the modem/device 118/116 of a customer site 104, the modem/device 118/116 transmits an ARQ message to the transceiver 120 of the base station 104. In response to the ARQ message, the base station resends the improperly transmitted or received data packet. If the same customer site 102 experiences numerous poor transmissions, or if numerous customer sites 102 experience poor transmissions, the system 100 is effectively slowed down. Specifically, the system 100 must wait to continue transmitting new data while the base station 104 re-transmits improperly transmitted data packets.

The customer site 102 includes the modem 118, and an associated transceiver 200, both connected to the CPE device 116 whereat information and data received by the transceiver 200 is downloaded and/or displayed on the CPE device 116. Instead of the single antenna shown in FIG. 1, two or more antennas may be used to receive downstream signals 202 from the base station. The use of more than one antenna provides transmission diversity which ameliorates fading, as discussed earlier. Upstream signals 204 are sent by the transceiver 200 to the antenna 122 of the base station 104. Whether the ARQ technique of the co-pending application or another technique is used, upstream transmission 204 enables the customer site 102 to reserve bandwidth for the receipt of information and data available via downstream transmission 206 from the base station 104 and the origination source 108.

According to the present invention, deleterious effects on the system 100 as a whole caused by an ARQ—or other upstream transmission 204—from a user site 102 to the base station 104 are ameliorated.

Assuming that the user site 102 has been previously assigned the 64 QAM band for the receipt of data on the downstream path 202, if one or more of the data packets in a data message on the path 202 is missing, ARQ enables the user site 102 to send an upstream ARQ message to the base station 104 on the upstream path 204. According to the present invention, the available N tone bands transmitted by the base station 104 are more or less equally divided among the user sites 102 so that customer sites 102 re assigned to each QAM. Accordingly, only 1/N of the user sites 102 will experience any impact when a base station 104 receives an upstream ARQ from an affdected customer site 102 and retransmits the missing packet(s) to the affected user site 102. The remaining (N−1)/N user sites 102 will be unaffected by this event.

Moreover, according to the present invention, when the affected user site 102 experiences continuing or undue difficulty in properly receiving data from the base station 104, such will be reflected by the resulting ARQ messages received by the base station 104 from the affected user site 102. This invention provides that the processor/transceiver facilities 120 in the base station 104 detects these downstream transmission difficulties. When a selected or predetermined number of such difficulties has occurred, the facilities 120 assign a higher quality transmission path, such as 16 QAM, to the affected user site 102. This is achieved by the base station 104 sending an appropriate control or training message to the user site 102 on the downstream path 202. Ideally, the newly assigned transmission path results in the user site 102 experiencing an acceptable number of, or no, poor transmissions, thereby requiring the base station to retransmit fewer, or no, missing data packets and minimizing retransmissions to the user site 102 on either the 16 QAM or the 64 QAM bands.

The present invention contemplates that the acceptability of an original tone band may depend on their being less than a selected number of downstream transmission difficulties on the path 202 between the base station 104 and the customer site 102. As long as this condition of acceptability continues, the base station continues to transmit to the customer site 102 on the original tone band. If the condition of acceptability ceases to exist—that is, when more than the selected number of ARQ messages are sent upstream by the customer site 102 to the base station 104—the facilities 120 effect the use of a higher quality QAM between the affected customer site 102 and the base station 104. The foregoing may be referred to as a "go/no-go" algorithm. That is, the acceptable quality range for the downstream transmissions is one wherein fewer than a selected number of "lost" transmissions occur.

The present invention also contemplates the use of a "superior-acceptable-unacceptable" algorithm by the facilities 120 of the base station 104. According to this algorithm, the user site 102 is assigned to a higher quality QAM if the number of ARQ's exceeds the selected number, as in the last paragraph. However, the facilities 120 assign a lower quality QAM, if the use of the originally assigned tone band is higher in quality than necessary, specifically, if less than a selected number of ARQ's are transmitted upstream by the customer site 102. In view of the foregoing, the tone band originally selected for use by a given customer site may change to higher or lower bands over time as the facilities 120 detect more or less than predetermined numbers of ARQ's from the customer site 102. In other words, the QAM utilized between the base station 104 and a customer site 102 may, according to this algorithm be (1) superior—experience less than a first selected number of ARQ's, (2) inferior—experience more than a second selected number of ARQ's, or (3) acceptable—experience neither more ARQ's than the second selected number nor less ARQ's than the first selected number. Obviously, if the first and second selected numbers are the same, the algorithm used by the facilities 120 is the same as the go/no-go algorithm. Here, the acceptable quality range lies between superior and unacceptable, that is in the acceptable range.

Thus, the present invention contemplates first dividing or allocating the user sites 102 among a number of the available tone bands. This allocation has the initial impact of minimizing the effect on the system 100 of ARQ's and resulting retransmissions. Subsequently, the invention contemplates reassigning a customer site 102 to a different QAM. This reassignment may be in accordance with the above-described algorithms in the first place, and also assigns user sites 102 to transmission paths which are sufficient for good reception and are neither too good nor too bad.

Figure 2:
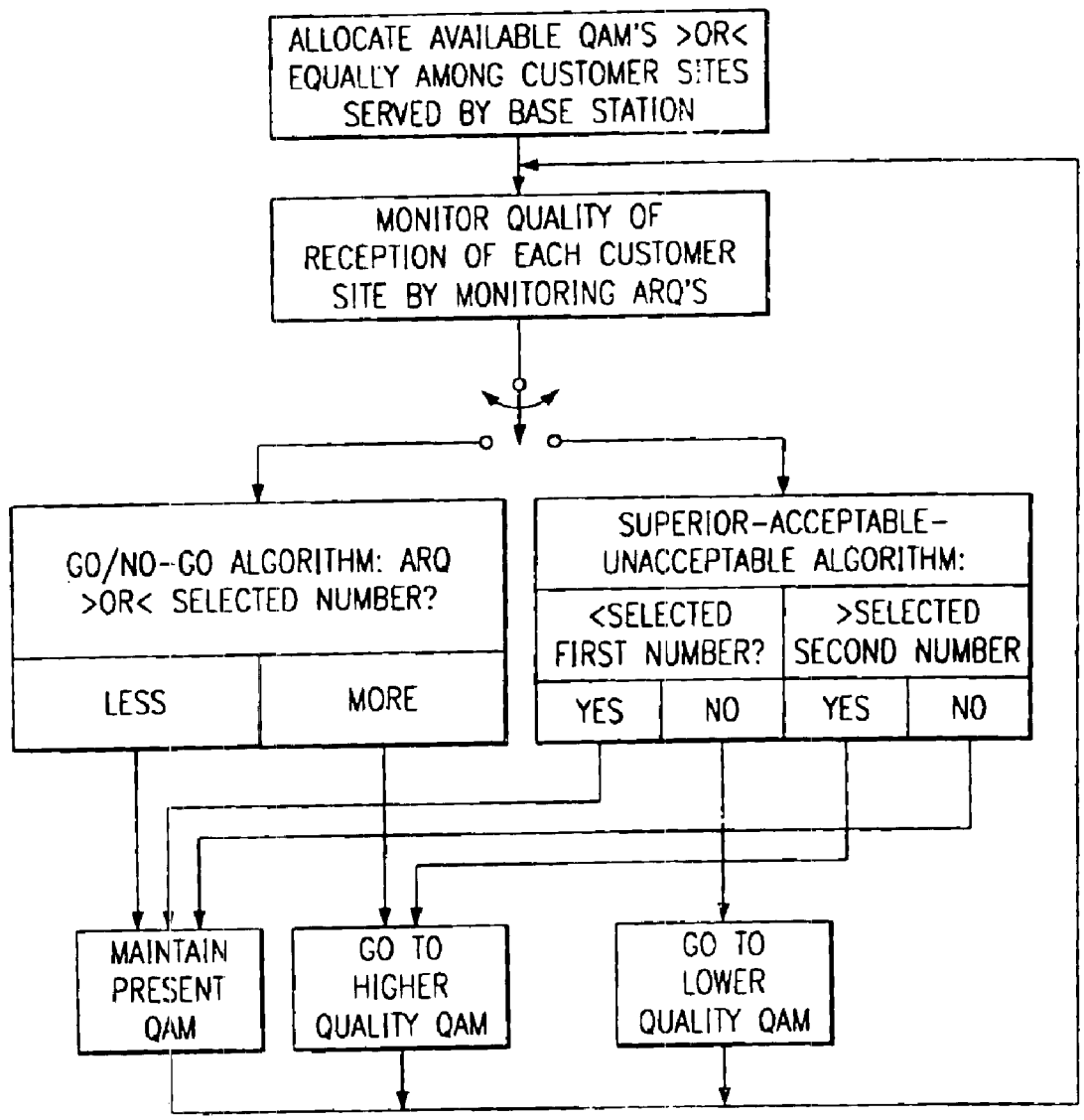
FIG. 2 is a flow chart or functional sequence illustrating a method according to the present invention and of the functions performed by apparatus according to the present invention.

FIG. 2 illustrates the operation of the system 100 implemented with downstream adaptive modulation as described above. In the first step 400 the available N QAM's utilized by a base station 104 are allocated among the customer sites 102 served thereby. The allocation results in each QAM being assigned to more or less the same number of customer sites 102. This allocation is initially made on the expected quality of upstream transmissions that the customer sites 1023 will experience, given the surrounding terrain, interfering bodies, climatological characteristics, etc.

Thereafter, step 402, the quality of the downstream transmissions from the base station 104 to each customer site 104 is monitored, preferably by the facilities 120 tracking ARQ's or similar upstream transmissions from the customer sites 102 to the base station 104. Depending on the algorithm used—go/no-go or superior-acceptable-inferior—if any customer site 102 experiences unacceptable downstream transmissions from the base station 104, the facilities reallocate that customer site 102 to a higher quality QAM, or, if superior upstream transmissions are experienced, reallocation may be to a lower quality QAM.

Although the present invention has been described in connection with a particular embodiment, those skilled in the art will appreciate that numerous adaptations and modifications may be made without departing from the spirit and scope of this invention as recited in the appended claims.

What is claimed is:

1. A method of performing downstream adaptive modulation in an MMDS, broadband, fixed wireless communication system having a base station with a transmitter-receiver and one or more CPE devices each having a transmitter-receiver, the system utilizing a DOCSIS MAC pursuant to which the DPU is a variable length, Ethernet-type data packet, which comprises:

operating the base station to transmit data downstream to the CPE devices in a plurality of data modulation modes;

assigning one of the modulation modes to each respective CPE device;

monitoring the quality of downstream data transmission to, and reception by, each CPE device; and if the quality of downstream data transmission to and reception by any CPE device receiving data in its assigned modulation mode lies outside a predetermined quality range, assigning a different modulating mode to such CPE device, the different mode rendering the data transmission quality within the predetermined quality range, wherein the monitoring step is effected by monitoring and analyzing upstream messages from the CPE devices.

2. The method of claim 1, wherein:

the quality range is zero and is effectively a break point between acceptable and unacceptable quality, the predetermined quality range representing acceptable quality and, if the quality of downstream data transmission to and reception by any CPE device receiving data in its assigned modulation mode is acceptable, no different modulation mode is assigned by the base station.

3. The method of claim 1, wherein:

the quality range is non-zero and represents acceptable quality, quality higher than the range being superior and quality below the range being unacceptable, and assigning a higher quality modulation mode to the affected CPE device if its reception quality is unacceptable or assigning a lower quality modulation range to the affected CPE device if its reception quality is superior, and permitting the modulation mode of the CPE device to remain unchanged if its reception quality is acceptable.

4. The method of claim 1, wherein:

each data modulation mode is a QAM mode that includes a group of tones and has a selected transmission time.

5. The method of claim 4, wherein the data modulation modes are $N^A$ QAM tones, $N^B$ QAM tones, $N^C$ QAM tones ... $N^Z$ QAM tones, where A<B<C< ... <Z.

6. The method of claim 5, wherein N=4, A=0, B=A+1, C=B+1 ... Z=Y+1.

7. The method of claim 4, wherein:

each tone group comprises a selected constellation density.

8. The method of claim 7, wherein:

each tone group has a constant bit rate.

9. The method of claim 1, wherein:

the assigning steps are effected by the base station transmitting downstream messages to the CPE devices.

10. The method of claim 1, wherein:

the monitoring step is effected by the base station receiving and analyzing upstream ARQ messages transmitted by the CPE devices.

11. The method of claim 1, wherein:

at any given time the base station transmits data simultaneously on all of the modulation modes, but each CPE device receives data only on the modulation mode then assigned thereto.

12. A method of performing downstream adaptive modulation in an MMDS, broadband, fixed wireless communication system having a base station with a first transmitter-receiver and one or more CPE devices each having a second transmitter-receiver, the system utilizing a DOCSIS MAC pursuant to which the DPU is a variable length, Ethernet-type data packet, which comprises:

operating the base station to transmit data downstream to the CPE devices in a plurality of QAM modes each of which includes a group of tones, a predetermined transmission time, a predetermined constellation density and a constant bit rate;

operating the base station to transmit training messages to the CPE devices to assign to each CPE device a selected one of the QAM modes;

operating each CPE device to transmit ARQ messages to the base station when data is improperly received by such CPE device;

operating the base station to monitor the quality of downstream data transmission to and reception by each CPE device by receiving and analyzing ARQ messages, a predetermined number of ARQ messages from a given CPE device indicating that the quality of data transmission to such CPE device is acceptable, a number of ARQ messages greater than the predetermined number indicating unacceptable quality; and assigning a higher quality QAM mode to any CPE device that transmits a number of ARQ messages greater than the predetermined number and assigning a lower quality QAM mode to any CPE device that transmits a number of ARQ messages less than the predetermined number.

13. The method of claim 12, wherein the QAM mode of any CPE device transmitting ARQ messages equal to the predetermined number remains unchanged.

14. Apparatus for performing downstream adaptive modulation in an MMDS, broadband, fixed wireless communication system having a base station with a transmitter-receiver and one or more CPE devices each having a transmitter-receiver, the system utilizing a DOCSIS MAC pursuant to which the DPU is a variable length, Ethernet-type data packet, which comprises:

first facilities in the base station for transmitting data downstream to the CPE devices in a plurality of data modulation modes;

second facilities in the base station for assigning a respective modulation mode to each respective CPE device;

third facilities in the base station for monitoring the quality of downstream data transmission to and reception by each CPE device; and fourth facilities in the base station for determining if downstream data transmission quality to and reception by any CPE device receiving data in its assigned modulation mode lies outside a predetermined quality range for assigning a different modulating mode to such CPE device which different mode adjusts the data transmission quality to be within the predetermined quality range, wherein the third facilities effect the monitoring step by monitoring and analyzing upstream messages from the CPE devices.

15. The apparatus of claim 14, wherein the quality range is zero and is effectively a break point between acceptable and unacceptable quality with the predetermined quality range representing acceptable quality, and if the quality of downstream data transmission to and reception by any CPE device receiving data in its assigned modulation mode is acceptable, the fourth facilities assign no different modulation mode.

16. The apparatus of claim 14, wherein the quality range representing acceptable quality is non-zero, quality higher than the range is superior and quality below the range is unacceptable; and wherein the fourth facility: (i) assigns a higher quality modulation mode to the affected CPE device if its reception quality is unacceptable, (ii) assigns a lower quality modulation range to the affected CPE device if its reception quality is superior, and (iii) permits the modulation mode of the affected CPE device to remain unchanged if its reception quality is acceptable.

17. The apparatus of claim 14, wherein each data modulation mode is a QAM mode that includes a group of tones and has a selected transmission time.

18. The apparatus of claim 17, wherein the data modulation modes are $N^A$ QAM tones, $N^B$ QAM tones, $N^C$ QAM tones ... $N^Z$ QAM tones, where $A<B<C< ... <Z$.

19. The apparatus of claim 18, wherein N=4, A=0, B=A+1, C=B+1 ... Z=Y+1.

20. The apparatus of claim 17, wherein each tone group comprises a selected constellation density.

21. The apparatus of claim 17, wherein each tone group has a constant bit rate.

22. The apparatus of claim 16, wherein the second facilities transmit training messages to the CPE devices in order to effect the assigning function.

23. The apparatus of claim 16, wherein the third facilities receive and analyze the upstream ARQ messages transmitted by the CPE devices.

24. The apparatus of claim 16, wherein at any given time the first facilities transmit data simultaneously on all of the modulation modes, but each CPE device receives data only on the modulation mode then assigned thereto.

25. An apparatus for performing downstream adaptive modulation in an MMDS, broadband, fixed wireless communication system having a base station with a first transmitter-receiver and one or more CPE devices each having a second transmitter-receiver, the system utilizing a DOCSIS MAC pursuant to which the DPU is a variable length, Ethernet-type data packet, which comprises:

first means in the base station for transmitting data downstream to the CPE devices in a plurality of QAM modes each of which includes a group of tones, a predetermined transmission time, a predetermined constellation density and a constant bit rate;

second means in the base station for transmitting training messages to the CPE devices to assign to each CPE device only a selected one of the QAM modes;

facilities in each CPE device for transmitting ARQ messages to the base station when data is improperly received by such CPE device;

third means in the base station for monitoring the quality of downstream data transmission to and reception by each CPE device by receiving and analyzing ARQ messages, a predetermined number of ARQ messages from a given CPE device indicating that the quality of data transmission to such CPE device is acceptable, a number of ARQ messages greater than the predetermined number indicating unacceptable quality; and fourth means in the base station operating in conjunction with the second means for assigning a higher quality QAM mode to any CPE device that transmits a number of ARQ messages greater than the predetermined number and assigning a lower quality QAM mode to any CPE device that transmits a number of ARQ messages less than the predetermined number.

26. The apparatus of claim 25, wherein the QAM mode of any CPE device transmitting ARQ messages equal to the predetermined number remains unchanged.

* * * * *